(12) United States Patent
Zhou et al.

(10) Patent No.: US 12,096,358 B2
(45) Date of Patent: Sep. 17, 2024

(54) TWT BASED MULTI-CONNECTION MECHANISM

(71) Applicant: Hewlett Packard Enterprise Development LP, Houston, TX (US)

(72) Inventors: Qiang Zhou, Santa Clara, CA (US); Andre Beaudin, Québec (CA); Mohd Shahnawaz Siraj, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 348 days.

(21) Appl. No.: 17/599,741

(22) PCT Filed: Dec. 5, 2019

(86) PCT No.: PCT/CN2019/123264
§ 371 (c)(1),
(2) Date: Sep. 29, 2021

(87) PCT Pub. No.: WO2021/109063
PCT Pub. Date: Jun. 10, 2021

(65) Prior Publication Data
US 2022/0159571 A1  May 19, 2022

(51) Int. Cl.
*H04W 76/15* (2018.01)
*H04W 52/02* (2009.01)
*H04W 84/12* (2009.01)

(52) U.S. Cl.
CPC ....... *H04W 52/0219* (2013.01); *H04W 76/15* (2018.02); *H04W 84/12* (2013.01)

(58) Field of Classification Search
CPC . H04W 52/0219; H04W 76/15; H04W 84/12; H04W 52/0216; H04W 72/0446;
(Continued)

(56) References Cited

U.S. PATENT DOCUMENTS 10,517,106 B1 * 12/2019 Wang .................... H04W 72/12
10,791,516 B1 *  9/2020 Chu .................. H04W 52/0216
(Continued)

FOREIGN PATENT DOCUMENTS

CN      107743721 A   2/2018
EP        3493629 A1   6/2019
(Continued)

OTHER PUBLICATIONS

Chen, Q., et al, "A Target Wake Time Scheduling Scheme for Uplink Multiuser Transmission in IEEE 802.11ax-Based Next Generation WLANs," IEEE Access, vol. 7, Oct. 30, 2019, pp. 158207-158222.
(Continued)

*Primary Examiner* — Jean A Gelin
(74) *Attorney, Agent, or Firm* — Hewlett Packard Enterprise Patent Department

(57) ABSTRACT

Systems, methods, and computer readable mediums for a TWT based multi-connection mechanism include sending, by a station, a first request for a first Target Wake Time (TWT) session with a first access point, wherein the first TWT session is established, determining, by the station and based on the first TWT session, a timing for a second TWT session such that a plurality of service periods of the first TWT session do not overlap with a plurality of service periods of the second TWT session, sending, by the station, a second request for the second Target Wake Time (TWT) session with a second access point, and wherein the second. TWT session is established, and receiving, by the station, data from the first AP during a service period of the first TWT session and data from the second AP during a service period of the second TWT session.

20 Claims, 5 Drawing Sheets

(58) Field of Classification Search
CPC . H04W 72/0453; H04W 72/51; H04W 74/06; H04W 76/10
USPC .......................................................... 370/311
See application file for complete search history.

(56) References Cited

U.S. PATENT DOCUMENTS

| | | | |
|---|---|---|---|
| 11,445,438 B2* | 9/2022 | Choo | H04L 27/2602 |
| 2016/0249383 A1* | 8/2016 | Kwon | H04W 72/23 |
| 2017/0064625 A1 | 3/2017 | Sampath et al. | |
| 2017/0265130 A1* | 9/2017 | Kakani | H04W 48/10 |
| 2018/0192372 A1* | 7/2018 | Park | H04W 52/0229 |
| 2018/0310245 A1* | 10/2018 | Ouchi | H04W 52/0238 |
| 2018/0332534 A1* | 11/2018 | Hou | H04W 72/0446 |
| 2019/0021055 A1* | 1/2019 | Guo | H04W 52/0229 |
| 2019/0045438 A1 | 2/2019 | Cariou et al. | |
| 2019/0141631 A1* | 5/2019 | Patil | H04W 52/0229 |
| 2019/0182714 A1* | 6/2019 | Chu | H04W 74/08 |
| 2019/0253967 A1* | 8/2019 | Xiao | H04W 52/0219 |
| 2019/0253968 A1* | 8/2019 | Xiao | H04W 76/25 |
| 2019/0306790 A1* | 10/2019 | Kottontavida | H04W 72/52 |
| 2019/0335454 A1 | 10/2019 | Huang et al. | |
| 2020/0084102 A1* | 3/2020 | Choi | H04W 4/80 |
| 2020/0137612 A1* | 4/2020 | Li | H04W 28/0221 |
| 2020/0221381 A1* | 7/2020 | Homchaudhuri | H04W 52/0235 |
| 2021/0235449 A1* | 7/2021 | Chu | H04W 84/12 |
| 2021/0289516 A1* | 9/2021 | Lee | H04W 16/14 |
| 2021/0329547 A1* | 10/2021 | Kim | H04W 52/0229 |
| 2022/0039086 A1* | 2/2022 | Asterjadhi | H04W 72/51 |
| 2023/0180201 A1* | 6/2023 | Chu | H04W 84/12 370/329 |

FOREIGN PATENT DOCUMENTS

| | | |
|---|---|---|
| WO | 2018/048474 A1 | 3/2018 |
| WO | 2018/140177 A2 | 8/2018 |

OTHER PUBLICATIONS

International Search Report and Written Opinion received for PCT Application No. PCT/CN2019/123264, mailed on Aug. 28, 2020, 6 pages.

Nurchis et al., "Target Wake Time: Scheduled access in IEEE 802.11ax WLANs", Dec. 24, 2018, 14 pages.

Nurchis, M., et al., "Target Wake Time Schedule Access in IEEE 802.11ax WLANs," IEEE Wireless Communications, vol. 26, No. 2, Apr. 2019, pp. 142-150.

* cited by examiner

TWT BASED MULTI-CONNECTION MECHANISM

BACKGROUND

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The Institute of Electrical and Electronics Engineers (IEEE) publish many popular specifications for use in wireless under the 802.11 standard family. 802.11 continues to evolve in an attempt to address all challenges presented with the proliferation of wireless devices.

In particular, the IEEE 802.11ax project started in May 2014 with the formation of TGax as a successor to the successful IEEE 802.11ac standard. The main objectives of the TGax was to define a physical layer and a medium access control capable of supporting at least a four times improvement in average throughput per station in a dense deployment scenario when compared to IEEE 802.11ac. However, the 802.11ax standard itself does not address all issues that need to be solved. Further improvements are needed to maximize the potential of 802.11ax.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
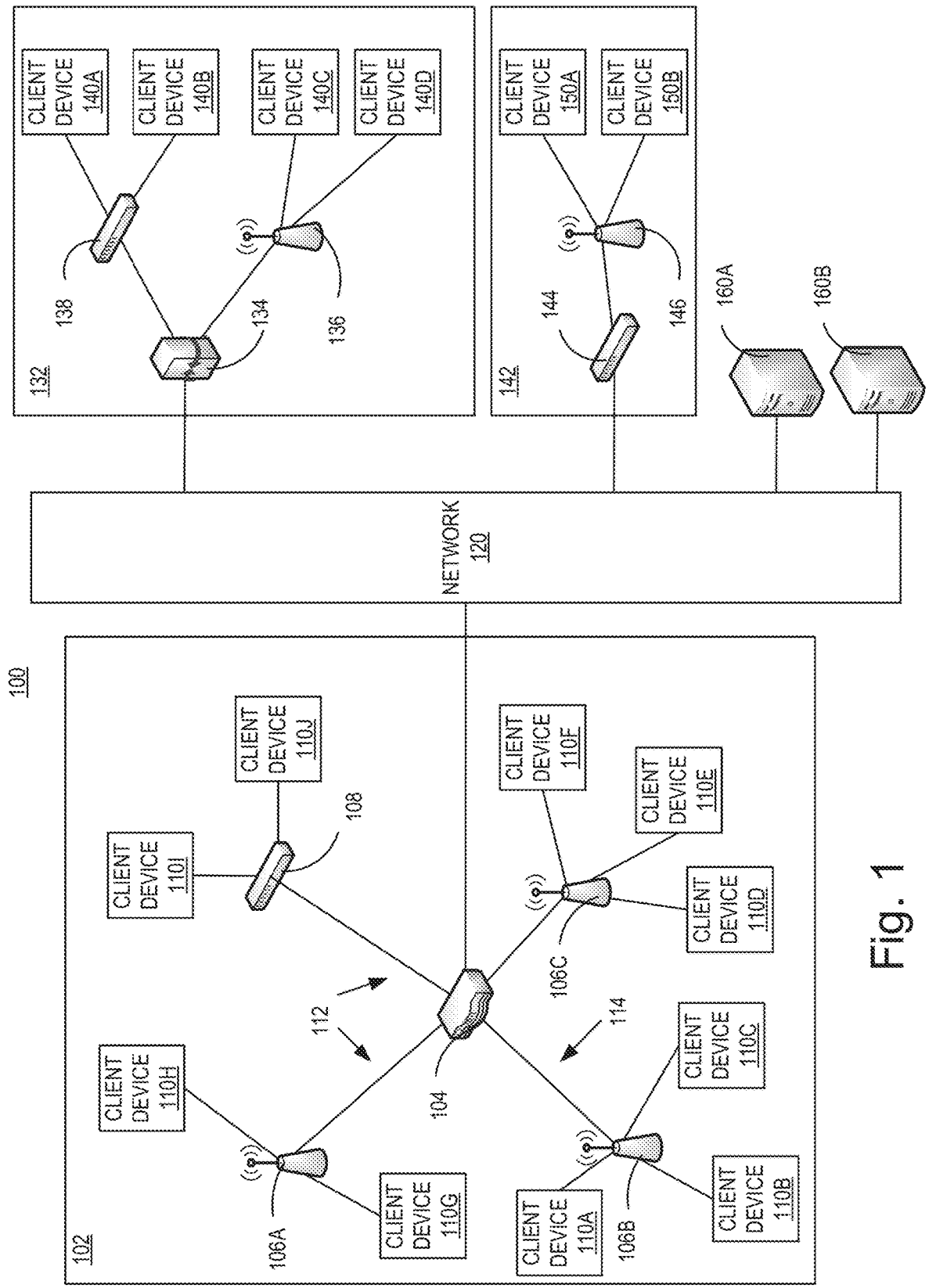
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations of the disclosed technology may include systems, computer readable mediums, and methods for a TWT based multi-connection mechanism.

To understand the present invention, a basic understanding of Institute of Electrical and Electronics Engineers (IEEE) 802.11 and IEEE 802.11ax is needed. The minimum understanding necessary is described below, but further detail and guidance may be found in the 802.11ax standard, as well as other related 802.11 standards, Multi-User Multiple Input Multiple Output (MU-MIMO) allows a wireless device, such as an access point, to communicate with multiple devices simultaneously. This decreases the time each device has to wait for a signal and can dramatically speed up a network. In short, MU-MIMO works by using multiple antennas to send data to multiple devices/stations.

One of the main features added to the 802.11ax specification was Orthogonal Frequency-Division Multiple Access (OFDMA). At a physical layer level it means multiple entities transmitting data at the same time over different frequency tones/subcarriers where the subcarriers are orthogonal to each other. A timeslot containing a certain group of tones is known as a RU.

These advances allow for high density, high bandwidth deployment of wireless networks. However, these high density deployments brought about high levels of channel contention, which may prevent or limit the ability to meet users' increasing demands. To help mitigate the negative effects of channel contention, 802.11ax improved the Target Wake Time (TWT) introduced in 802.11ah. TWT is a more efficient mechanism for stations to enter and exit power save by negotiating a wakeup with 802.11ax Access Points (APs) so that the wake up cycles can be scheduled efficiently to reduce contention if multiple stations (STAs) wake up at the same time and poll for frames. Thus, TWT is a power saving and scheduling mechanism that enables STAs in power save mode to sleep for periods of time and wake up at prescheduled times to exchange information with their AP. The AP defines a set of target wake times and service periods that are used by the station to determine its wake up pattern and duration of time for accessing the medium. Stations can sleep outside of TWT service periods, reducing stations power consumption, and the AP can manage activity in the basic service set by scheduling stations to operate at different times, minimizing contention. STAs should not transmit outside of their TWT service period. TWTs can either be individually negotiated between the station and the AP (Individual TWT) or can be broadcast by the AP in the Beacon frame.

Some relevant terms to this invention include: TWT: next time in microseconds at which the station participating in the TWT-based communication should wake up for the TWT session; TWT Wake interval: the time interval between subsequent TWT sessions for the station. The value is higher than 0 when the TWT is periodic. Minimum TWT wake duration: minimum time duration a station shall stay awake since the starting time of the TWT session so as to be able to receive frames from the other station(s).

Given this background, one can understand the advantages of TWT. However, there are some downsides that have not yet been solved, some of which the present invention addresses.

As described in more detail with reference to FIG. 1, a. Wireless LAIN (WLAN) may include a plurality of Access Points (APs), as elements of the WLAN. These APs in the deployed network may be referred to as deployed APs for ease of discussion.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120.

The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Although 10 client devices 110a j, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time.

Figure 2:
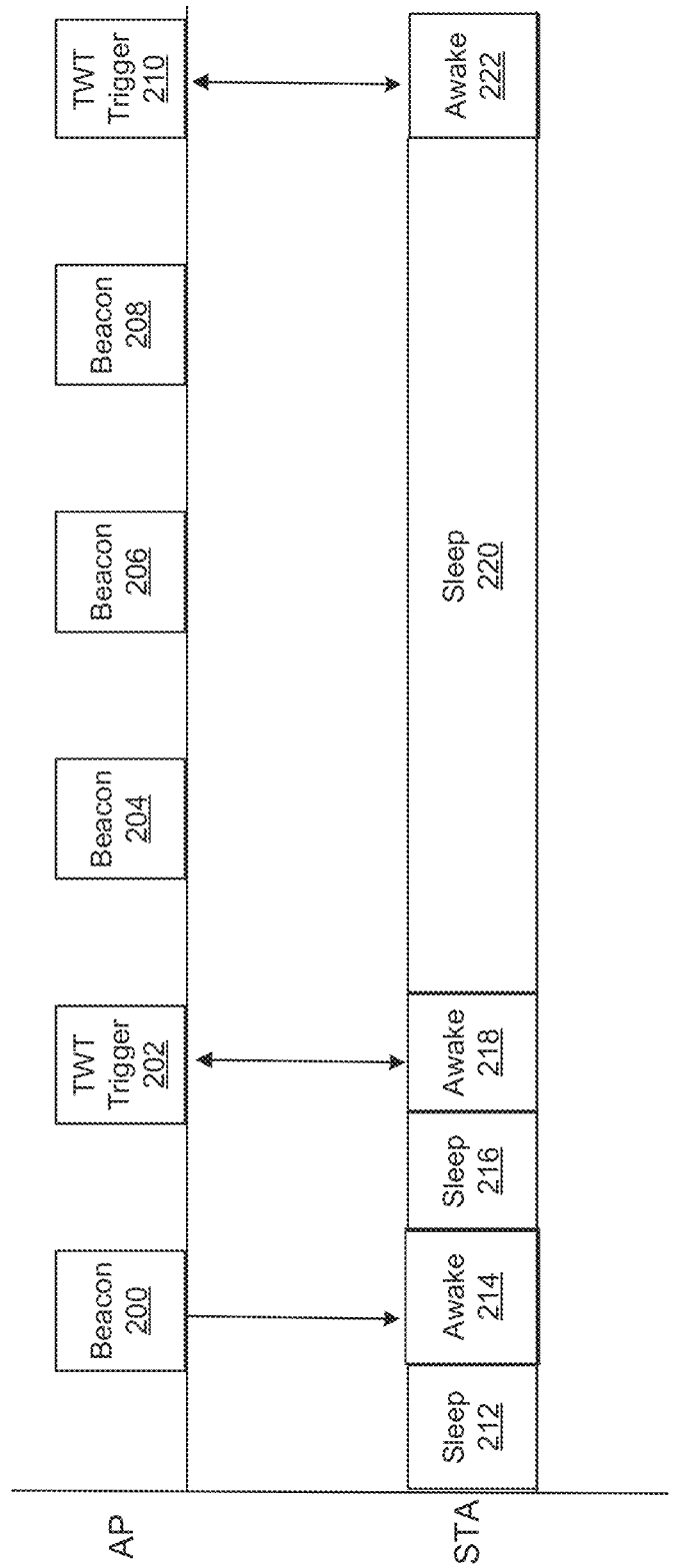
FIG. 2 illustrates an example of TWT based multi-connection mechanism in accordance with one embodiment.

Returning to the description of 802.11ax TWT features, the new TWT mechanism in 802.11ax allows more flexible, long-term and even multi-client sleeping arrangements. First, a negotiation between the client and AP sets up an agreed schedule for the client to wake and communicate. The schedule is often periodic, with a long, multi-beacon interval (minutes, perhaps hours or days) between activities. When the designated time arrives, the client wakes, awaits a polling trigger frame from the AP (required in multi-user mode) and exchanges data, subsequently returning to the sleep state. FIG. 2 shows an example of this.

In FIG. 2, beacons 200, 204, 206, 208 from an AP are shown, as well as the TWT Triggers 202, 210. In the example of FIG. 2, the TWT session has already been announced at the first beacon 200 and the first awake period 214. The STA Sleeps 212, 216, 220 and wakes 214, 218, 222 at the designated intervals. Data is exchanged during the awake periods as needed.

In various situations, there may be a requirement that a station or a client device needs to keep connections with different APs. Existing technologies that are based on legacy power save mechanisms or time slices will not perform as well as expected because the station or client is required to listen to beacons from associated APs to schedule next transmission of both sides and when beacon slots of different APs conflict, the client usually suffers frame missing or even disassociation from an AR The inventors have realized that, using TWT, one radio can associate to one AP and negotiate a TWT session with that AP. Then, the same radio can associate to a different AP and negotiate a different TWT session with a TWT Service Period (SP) that does not overlap with last TWT session's SP. Then, this radio can interact with different APs during each negotiated. TWT SP.

Figure 3:
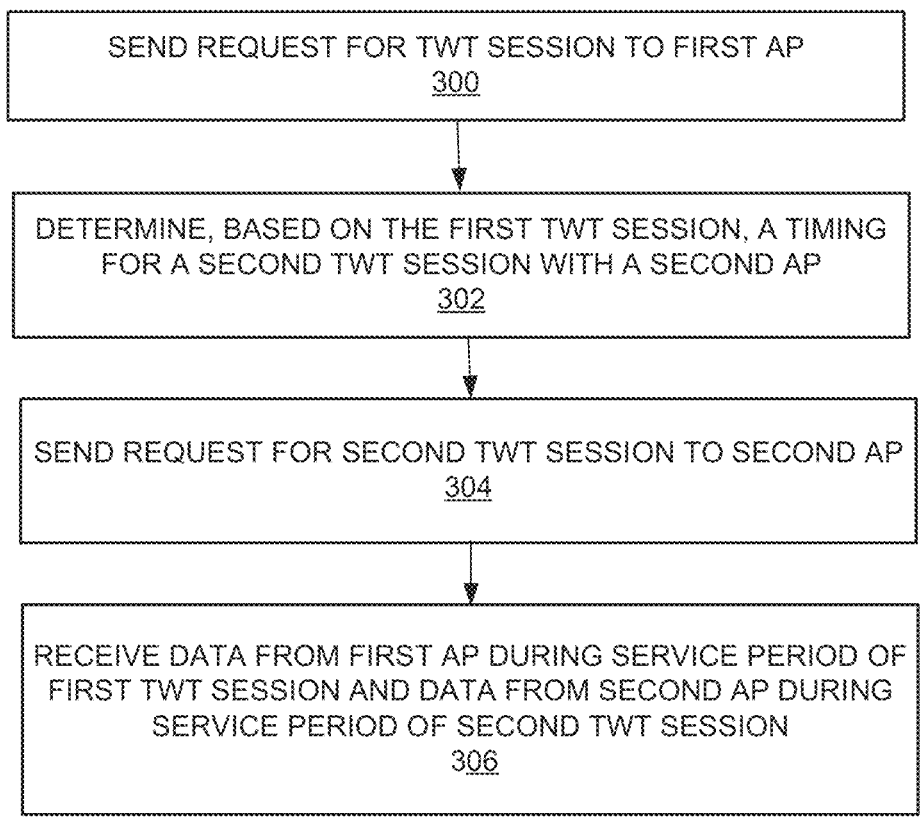
FIG. 3 is a flowchart for a TWT based multi-connection mechanism in accordance with one embodiment.

FIG. 3 illustrates an example flowchart for TWT based multi-connection mechanism. Although the steps depicted in FIG. 3 are shown in an order, the steps may be performed in any order at any time. A hardware processor is able to execute the instructions stored on a machine-readable storage medium to perform the steps described below.

In step 300, a request is sent for a TWT session to a first AP. The request may be sent in any manner or format now known or later developed. In particular, the request may confirm to any requirements of 802.11ah or 802.11ax. The request may specify parameters for the TWT session including, but not limited to: minimum TWT wake duration, TWT wake interval, and TWT wake time. TWT wake time is the next time in microseconds at which the station participating in the TWT-based communication should wake up for the TWT session. TWT Wake interval is the time interval between subsequent TWT sessions for the station. The value is higher than 0 when the TWT is periodic. Minimum TWT wake duration is the minimum time duration a station shall stay awake since the starting time of the service period so as to be able to receive frames from the other station(s).

The request may be handled or responded to by the AP in any appropriate manner. In alternative embodiments, step 300 may be performed at a different time or in a different order as is shown in FIG. 3. For example, the station could determine desired timings for various TWT sessions prior to sending a first request. Many other timings or orderings are also possible and, thus, the invention should not be limited to the exact configuration discussed herein.

In step 302, a timing for a second TWT session with a second AP is determined based on the first TWT session. The determination may be made in any suitable manner. In particular, the timings of the two (or more) TWT sessions do not overlap. This ensures that a station is only awake and listening for data from a single AP at a given moment. The following formulas may be used to determine the timings for a TWT session.

$$TWT_{SP(X,n)} = \left(TWT_{SP_{Start}}(X, n), TWT_{SP_{Stop}}(X, n)\right)$$

$$TWT_{SP_{Start}}(X, n) = TWT_{START}(X) + TWT_{INTERVAL}(X) * (n - 1)$$

$$TWT_{SP_{Stop}}(X, n) =$$
$$TWT_{START}(X) + TWT_{INTERVAL}(X) * (n - 1) + TWT_{Duration(X)};$$

In the above formulas, $TWT_{SP_{Start}}(X, n)$ is a start time of an nth TWT service period between AP X and a current station. $TWT_{SP_{Stop}}(X,n))$ is a stop time of an nth TWT service period between AP X and a current station. $TWT_{START}(X)$ is a time at which the station begins participating in the TWT session, $TWT_{INTERVAL}(X)$ is a time interval between subsequent TWT wake ups for the station. $TWT_{Duration(X)}$ is a minimum time duration the station stays awake.

All available TWT service periods between a current station and AP X is the set of $TWT_{SP(X,n)}:TWT_{SPs(X)} = \{TWT_{SP(X,n)}|, X>0$ and $X \in N, n>0,$ and $n \in N\}$. The intersection of the set of TWT SPs for AP X and AP Y is empty when X!=Y where X and Y are different APs. In other words, $TWT_{SPs(X)} \cap TWT_{SPs(Y)} = \emptyset$.

In step 304, a request for a second TWT session is sent to the second AP. The request for the second TWT session may be set at any time after the first request, in any format, using any method now known or later developed. The request for the second TWT may include any information needed to negotiate or establish the second TWT session. In particular, the timings determined in step 302 are included in the request for the second TWT session so that, once established, the second TWT session will not interfere with the previously established session.

In step 306, data is received from the first AP during a service period of the first TWT session, and data is received from a second AP during a service period of the second TWT session. Any amount of data may be received in any format or method. Optionally, if the AP does not have any data to send to the station during the service period, then no (or limited) data may be exchanged. Outside of the service periods the station may sleep as appropriate, or perform other tasks.

The many advantages of this invention include, but are not limited to: a single radio can keep connections to different APs or radios at the same time without any packet drop. This could be a substantial change/improvement for various technologies such as redundancy of WLAN Mesh or redundancy of WLAN uplink. The invention also improves roaming and redundancy performance of Client/Internet of Things (IoT) devices. Additionally, since the total station throughput is shared across different APs, and possibly different channels, per AP channel utilization can be reduced.

Figure 4:
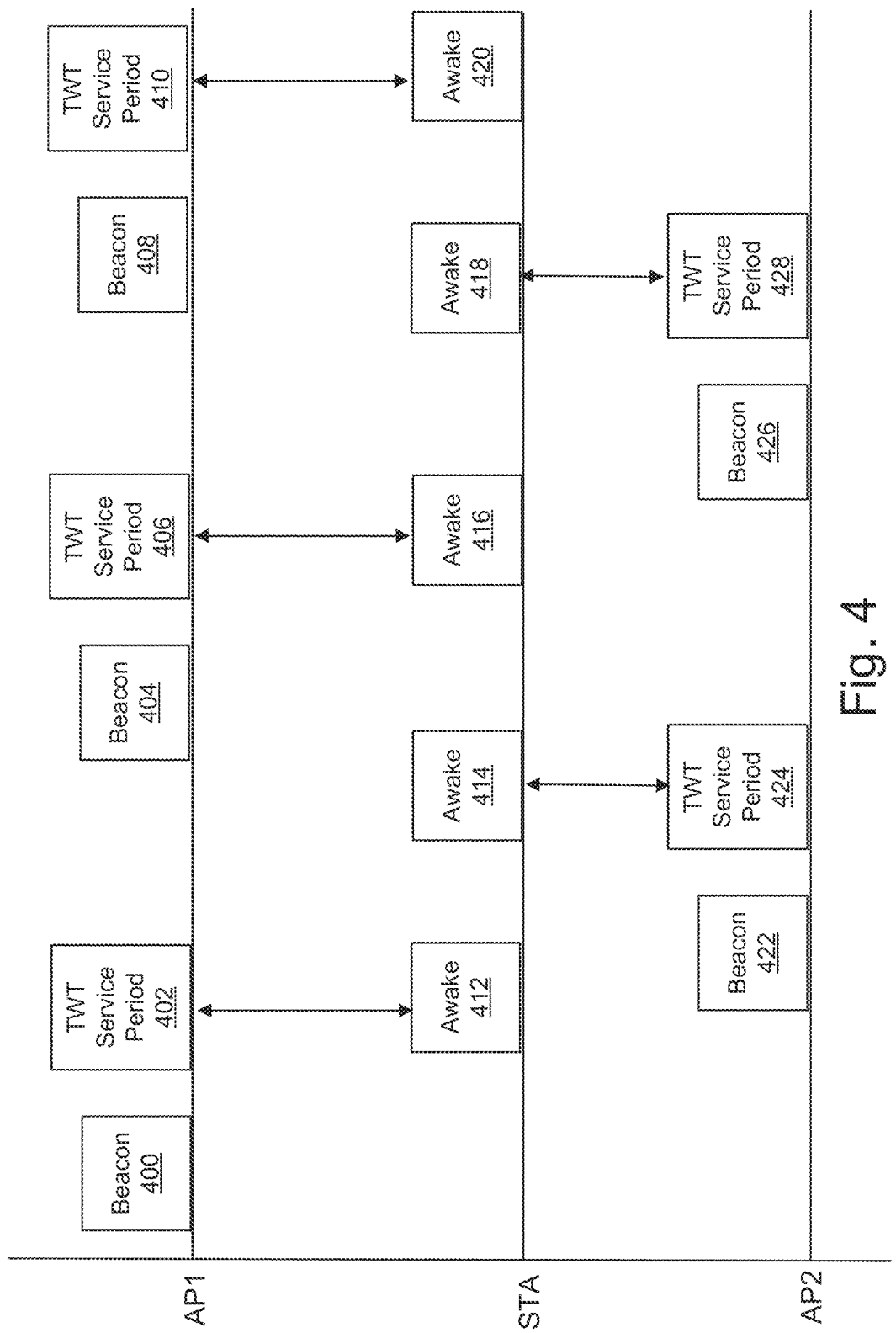
FIG. 4 illustrates an example of TWT based multi-connection mechanism in accordance with one embodiment.

FIG. 4 shows an example of TWT based multi-connection mechanism in accordance with one or more embodiments of the invention. In FIG. 4, a station that is maintaining two TWT sessions with different APs, AP1 and AP2, is depicted. In the example of FIG. 4, the TWT sessions have already been negotiated and established, and the non-overlapping nature of the TWT sessions is highlighted.

AP1 sends beacons 400, 404, 408 at predetermined intervals. AP1 also sends data during the TWT service period 402, 406, 410 as needed. Likewise, AP2 also sends beacons 422, 426 at predetermined intervals. AP2 also sends data during the TWT service period 424, 428, as needed, STA may sleep when it is not awake 412, 414, 416, 418, 420. The times when STA is awake correspond to the TWT service periods 402, 406, 410, 424, 428 of AP1 and AP2. In particular, awake 412, 416, 420 correspond to the first TWT session with AP1, while awake 414, 418 correspond to the second TWT session with AP2.

Figure 5:
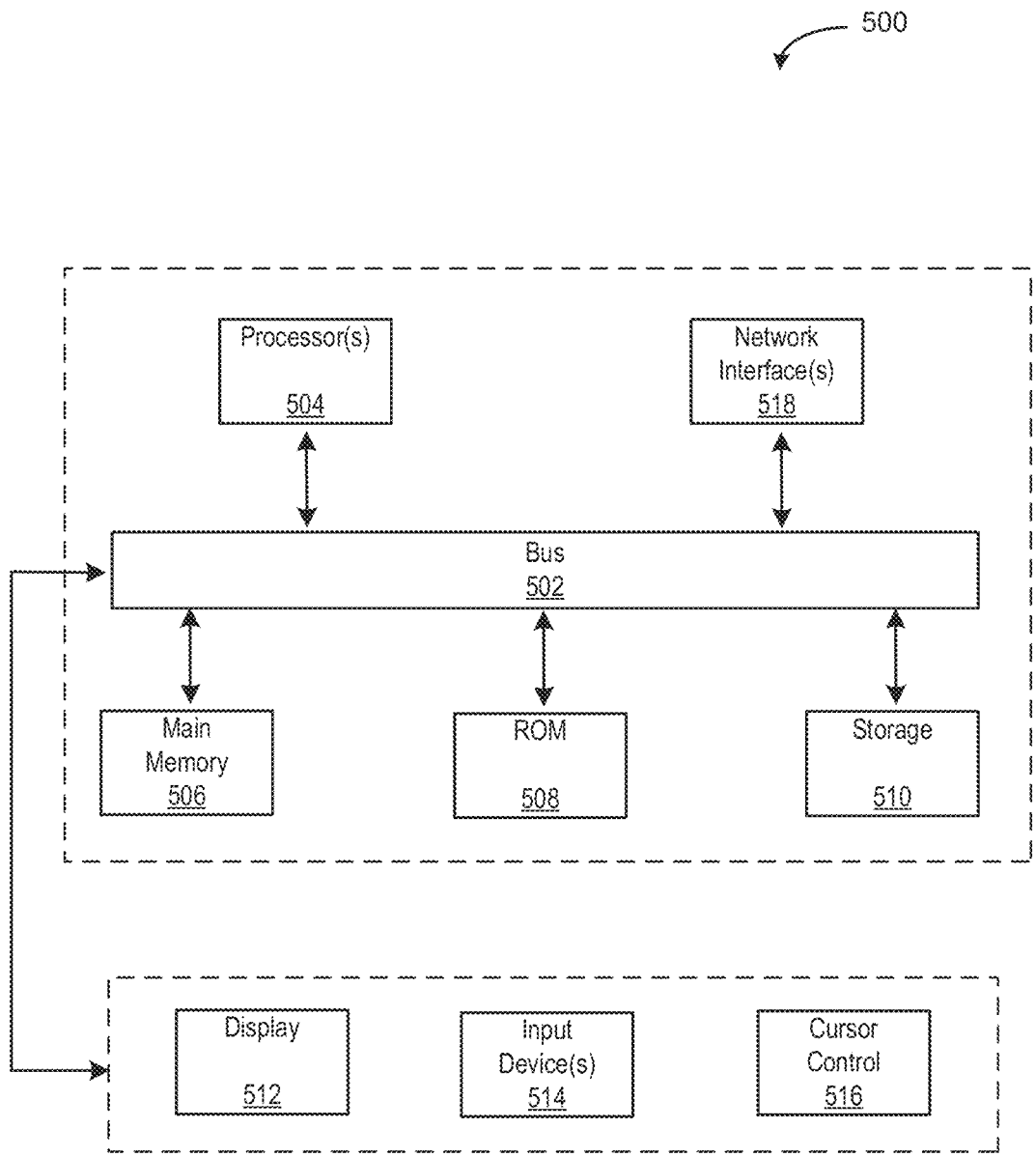
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504, Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, Object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example. Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar term is, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information, A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution, Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner, Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   sending, by a station to a first access point, a first request for a first Target Wake Time (TWT) session with the first access point, wherein the first TWT session is established with the first access point;
   determining, by the station and based on the first TWT session with the first access point, a timing for a second TWT session with a second access point, such that a first plurality of service periods of the first TWT session with the first access point do not overlap with a second plurality of service periods of the second TWT session with the second access point;
   sending, by the station to the second access point, a second request for the second TWT session with the second access point, wherein the second TWT session with the second access point uses the timing for the second TWT session, and wherein the second TWT session is established with the second access point; and receiving, by the station, data from the first access point during a service period of the first TWT session, wherein the data from the first access point is received absent receiving data from the second access point, and receiving, by the station, data from the second access point during a service period of the second TWT session, wherein the data from the second access point is received absent receiving data from the first access point.

2. The method of claim 1, wherein the first request comprises a first TWT start time, a first TWT interval, and a first TWT duration.

3. The method of claim 1, wherein the plurality of service periods of the first TWT are times where the station performs one or more of waking up to listen for data packets from the first access point and sending data packets to the first access point.

4. The method of claim 1, wherein the first access point and the second access point are different.

5. The method of claim 1, wherein the station supports one or more of 802.11ah and 802.11ax.

6. The method of claim 1, wherein the determination is made using the following formulas:

$$TWT_{SP(X,n)} = (TWT_{SP_{Start}}(X, n), TWT_{SP_{Stop}}(X, n));$$

$$TWT_{SP_{Start}}(X, n) = TWT_{START}(X) + TWT_{INTERVAL}(X) * (n - 1);$$

$$TWT_{SP_{Stop}}(X, n) =$$
$$TWT_{START}(X) + TWT_{INTERVAL}(X) * (n - 1) + TWT_{Duration(X)};$$

wherein $TWT_{SP_{Start}}(X, n)$ is a start time of an nth TWT service period between AP X and a current station;

wherein $TWT_{SP_{Stop}}(X, n))$ is a stop time of an nth TWT service period between AP X and a current station;

wherein $TWT_{START}(X)$ is a time at which the station begins participating in the TWT session;

wherein $TWT_{INTERVAL}(X)$ is a time interval between subsequent TWT wake ups for the station;

wherein $TWT_{Duration(X)}$ is a minimum time duration the station stays awake.

7. The method of claim 1, wherein the station is an access point.

8. A non-transitory machine-readable storage medium encoded with instructions executable by a hardware processor of a computing component, the machine-readable storage medium comprising instructions to cause the hardware processor to:

send a first request, to a first access point, for a first Target Wake Time (TWT) session with the first access point, wherein the first TWT session is established with the first access point;

determine, based on the first TWT session with the first access point, a timing for a second TWT session with a second access point, such that a first plurality of service periods of the first TWT session with the first access point do not overlap with a second plurality of service periods of the second TWT session with the second access point;

send a second request, to the second access point, for the second TWT session with the second access point, wherein the second TWT session with the second access point uses the timing for the second TWT session, and wherein the second TWT session is established with the second access point; and receive data from the first access point during a service period of the first TWT session, wherein the data from the first access point is received absent receiving data from the second access point, and receiving, by the station, data from the second access point during a service period of the second TWT session, wherein the data from the second access point is received absent receiving data from the first access point.

9. The non-transitory machine-readable storage medium of claim 8, wherein the first request comprises a first TWT start time, a first TWT interval, and a first TWT duration.

10. The non-transitory machine-readable storage medium of claim 8, wherein the plurality of service periods of the first TWT are times where the station wakes up to listen for data packets from the first access point.

11. The non-transitory machine-readable storage medium of claim 8, wherein the first access point and the second access point are different.

12. The non-transitory machine-readable storage medium of claim 8, wherein the station supports one or more of 802.11ah and 802.11ax.

13. The non-transitory machine-readable storage medium of claim 8, wherein the determination is made using the following formulas:

$$TWT_{SP(X,n)} = (TWT_{SP_{Start}}(X, n), TWT_{SP_{Stop}}(X, n));$$

$$TWT_{SP_{Start}}(X, n) = TWT_{START}(X) + TWT_{INTERVAL}(X) * (n - 1);$$

$$TWT_{SP_{Stop}}(X, n) =$$
$$TWT_{START}(X) + TWT_{INTERVAL}(X) * (n - 1) + TWT_{Duration(X)};$$

wherein $TWT_{SP_{Start}}(X, n)$ is a start time of an nth TWT service period between AP X and a current station;

wherein $TWT_{SP_{Stop}}(X, n))$ is a stop time of an nth TWT service period between AP X and a current station;

wherein $TWT_{START}(X)$ is a time at which the station begins participating in the TWT session;

wherein $TWT_{INTERVAL}(X)$ is a time interval between subsequent TWT wake ups for the station;

wherein $TWT_{Duration(X)}$ is a minimum time duration the station stays awake.

14. The non-transitory machine-readable storage medium of claim 8, wherein the station is an access point.

15. A station, comprising:

a processor;

a memory, the memory storing instructions which, when executed by the processor, cause the processor to:

send a first request to a first access point for a first Target Wake Time (TWT) session with the first access point, wherein the first TWT session is established with the first access point;

determine, based on the first TWT session with the first access point, a timing for a second TWT session with a second access point, such that a first plurality of service periods of the first TWT session with the first access point do not overlap with a second plurality of service periods of the second TWT session with the second access point;

send a second request to the second access point for the second TWT session with the second access point, wherein the second TWT session with the second access point uses the timing for the second TWT session, and wherein the second TWT session is established with the second access point; and receive data from the first access point during a service period of the first TWT session, wherein the data from the first access point is received absent receiving data from the second access point, and receiving, by the station, data from the second access point during a service period of the second TWT session, wherein the data from the second access point is received absent receiving data from the first access point.

16. The station of claim 15, wherein the first request comprises a first TWT start time, a first TWT interval, and a first TWT duration.

17. The station of claim 15, wherein the plurality of service periods of the first TWT are times where the station wakes up to listen for data packets from the first access point.

18. The station of claim 15, wherein the first access point and the second access point are different.

19. The station of claim 15, wherein the station supports one or more of 802.11ah and 802.11ax.

20. The station of claim 15, wherein the determination is made using the following formulas:

$$TWT_{SP(X,n)} = \left(TWT_{SP_{Start}}(X, n), TWT_{SP_{Stop}}(X, n)\right);$$

$$TWT_{SP_{Start}}(X, n) = TWT_{START}(X) + TWT_{INTERVAL}(X) * (n - 1);$$

$$TWT_{SP_{Stop}}(X, n) =$$
$$TWT_{START}(X) + TWT_{INTERVAL}(X) * (n - 1) + TWT_{Duration(X)};$$

wherein $TWT_{SP_{Start}}(X, n)$ is a start time of an nth TWT service period between AP X and a current station;

wherein $TWT_{SP_{Stop}}(X, n))$ is a stop time of an nth TWT service period between AP X and a current station;

wherein $TWT_{START}(X)$ is a time at which the station begins participating in the TWT session;

wherein $TWT_{INTERVAL}(X)$ is a time interval between subsequent TWT wake ups for the station;

wherein $TWT_{Duration(X)}$ is a minimum time duration the station stays awake.

* * * * *